United States Patent
Sarangapani

(10) Patent No.: US 10,137,325 B2
(45) Date of Patent: Nov. 27, 2018

(54) SYSTEM AND METHOD FOR DEACTIVATION AND DISPOSAL OF A PHARMACEUTICAL DOSAGE FORM

(71) Applicant: Shantha Sarangapani, Norwood, MA (US)

(72) Inventor: Shantha Sarangapani, Norwood, MA (US)

( * ) Notice: Subject to any disclaimer, the term of this patent is extended or adjusted under 35 U.S.C. 154(b) by 0 days.

(21) Appl. No.: 14/667,231

(22) Filed: Mar. 24, 2015

(65) Prior Publication Data

US 2015/0265867 A1    Sep. 24, 2015

Related U.S. Application Data

(60) Provisional application No. 61/969,473, filed on Mar. 24, 2014.

(51) Int. Cl.
| | |
|---|---|
| *A62D 3/38* | (2007.01) |
| *B01J 27/053* | (2006.01) |
| *B01J 31/22* | (2006.01) |
| *B65D 85/00* | (2006.01) |
| *B65D 81/02* | (2006.01) |
| *A62D 101/20* | (2007.01) |

(52) U.S. Cl.
CPC .............. *A62D 3/38* (2013.01); *B01J 27/053* (2013.01); *B01J 31/2295* (2013.01); *B65D 81/02* (2013.01); *B65D 85/70* (2013.01); *A62D 2101/20* (2013.01); *B01J 2231/70* (2013.01); *B01J 2531/842* (2013.01); *Y10T 428/13* (2015.01)

(58) Field of Classification Search
None
See application file for complete search history.

(56) References Cited

U.S. PATENT DOCUMENTS

| | | | | |
|---|---|---|---|---|
| 5,053,142 A | * | 10/1991 | Sorensen ................. | B09C 1/08 210/742 |
| 5,353,142 A | * | 10/1994 | Dodd ................ | G02F 1/133308 349/187 |
| 5,430,235 A | * | 7/1995 | Hooykaas ................ | A62D 3/33 405/129.3 |

(Continued)

OTHER PUBLICATIONS

Longzhu, Shen et al "Rapid Biomimentic Degradation in Water ...". Environmental Science and Technology. 45. 7882-7887 (2011).*

(Continued)

*Primary Examiner* — Sheng H Davis
(74) *Attorney, Agent, or Firm* — Posternak Blankstein & Lund LLP

(57) ABSTRACT

A system and method are provided for deactivation and disposal of a pharmaceutical dosage form. The system and method employ an oxidant and an immobilizing agent placed in a container. The pharmaceutical dosage form is placed into the container, and water is added to the container. A rapid chemical deactivation of the active ingredient or ingredients in the pharmaceutical then occurs by a chemical oxidation process. Upon contact with the water, the immobilizing agent swells or expands in volume to form a gel or slurry, binding the other components in the container within the gel or slurry, where they remain after disposal. The system can be in the form of a kit, or can be scaled up for use by municipalities or institutions.

12 Claims, 5 Drawing Sheets

(56) References Cited

U.S. PATENT DOCUMENTS

| | | | | |
|---|---|---|---|---|
| 5,568,895 A | * | 10/1996 | Webb | A61L 11/00 |
| | | | | 241/101.71 |
| 8,535,711 B2 | * | 9/2013 | Anderson | A61K 9/7023 |
| | | | | 424/449 |
| 2005/0258110 A1 | * | 11/2005 | Block | B09C 1/002 |
| | | | | 210/758 |
| 2009/0054295 A1 | * | 2/2009 | Vicari | C01B 11/068 |
| | | | | 510/380 |

OTHER PUBLICATIONS

Longzhu, Shen. "Rapid, Biomimetic Degradation . . . " Enviro Science and Technology. 45, 7882-7887 (2011).*

* cited by examiner

SYSTEM AND METHOD FOR DEACTIVATION AND DISPOSAL OF A PHARMACEUTICAL DOSAGE FORM

CROSS-REFERENCE TO RELATED APPLICATIONS

This application claims the benefit of U.S. Provisional Application No. 61/969,473, filed on 24 Mar. 2014, which is hereby incorporated by reference in its entirety.

STATEMENT REGARDING FEDERALLY SPONSORED RESEARCH OR DEVELOPMENT

The invention was developed with support from Contract No. HHSN271201300040C (NIDA Ref. No. N43DA-13-4418). The U.S. Government may have certain rights in the invention.

BACKGROUND

Controlled substances such as opioids have the potential to be misused and abused and must be disposed of properly to avoid diversion to a drug addict. Drugs that are disposed of in household trash or flushed away may leach into landfills or enter the water supply, where they can do environmental harm.

Properly disposing of controlled substances is difficult for consumers. Drug take back programs exist, but are time consuming and inconvenient for many people. Even if disposed of in the trash, a drug can sometimes be retrieved and misused or abused. For example, packaging that encapsulates a pharmaceutical product to prevent leaching in a landfill can still be reopened by a person to access the drug. Some pharmacies have begun a mail-in program; however, these programs can be costly and inconvenient for consumers, which limits their use.

The inclusion of detection agents and/or inactivation agents in disposal packaging is known, in which the agent is released when the agent or the dosage form is misused. Such agents include indelible dyes, opioid receptors that bind the residual opioid into an insoluble ligand-receptor complex, opioid receptor antagonists, physical sequestering agents, or non-opioids with distressing or dysphoric properties. However, many inactivation agents are specific for a particular drug compound and are not effective when used with other drugs. Disposal may compound environmental discharge issues by the addition of more medically active compounds into landfills or the water supply. The detection and/or inactivating agents are released only when the article is misused, and therefore are not activated when the pharmaceutical is used properly and discarded.

Another known approach is the use of activated carbon to which pharmaceutical molecules and toxins can bind through intermolecular forces. Pharmaceuticals that are bound to the activated carbon are no longer mobile or physiologically active. However, this is an equilibrium process and is dependent on contact with the materials. Activated carbon absorbs a variety of organics and simple physical adsorption is not deactivation. A major drawback of adsorbents such as activated carbon is that they can easily be saturated due to surface fouling, non-specific adsorption, and overwhelming the adsorption capacity by inert formulation and insoluble ingredients, by addition of too much medication, or by inadequate mixing, resulting in poor or incomplete adsorption of the active pharmaceutical agent. For example, a commercial kit containing a limited amount of carbon exposed to hundreds of tablets could not reliably deactivate specific active ingredients. Also, by altering conditions such as pH, or by using selective solvent systems, active drugs could be desorbed by skilled practitioners. Kits in which activated carbon is included can be inconvenient to use, or may not be used correctly and yet still add to the mass in landfills.

SUMMARY OF THE INVENTION

The present invention relates to a system, kit, or device and method for deactivation and disposal of a pharmaceutical dosage form by chemically deactivating the active ingredient or ingredients and immobilizing the reaction products. The system and method result in 98 to essentially 100% chemical degradation of the active ingredients in pharmaceuticals from their original dosage form, at least within 72 hours and generally within 24 hours or sooner. The pharmaceuticals cannot be recovered even by a skilled practitioner after deactivation. The system can be provided in kit form employing a container that can be disposed of in household trash, and after disposal the pharmaceuticals will not leach out of the container into a landfill or groundwater. The system can also be scaled up for use by municipalities and medical or other institutions.

As used herein, the term "deactivation" of pharmaceutical agents such as opioid components of drug formulations or dosage forms refers to the chemical degradation of such pharmaceutical agents, and not merely their binding, adsorption, or rendering into a non-consumable form. Nevertheless, the invention contemplates in certain embodiments the binding or adsorption of chemical breakdown products or residual levels of pharmaceutical agents that survive the chemical deactivation process, so as to prevent their leaching into landfills. To that end, kits or systems of the invention may be provided with inexpensive sealing or barrier materials in addition to components for chemical degradation.

One aspect of the invention is a system for disposing of a pharmaceutical dosage form. The system includes a container, an oxidant, and an immobilizing agent.

In certain embodiments, the oxidant is selected from the group consisting of non-chlorine, stabilized peroxide compounds; stable chlorine-based oxidizing agents; metal oxides; and combinations thereof. For example, the oxidant can include or can be a peroxide compound selected from the group consisting of persulfate, permonosulfate, perborate, percarbonate, permanganate, stable organic peroxo compounds, and salts thereof. Alternatively, the oxidant can include magnesium oxide or calcium oxide. The oxidant also can include one or more metal oxides in the form of particles ranging in size from nanometers to micrometers.

In certain embodiments, the immobilizing agent can include or can be a gelling agent or an encapsulant, or a combination thereof. For example, the encapsulant can include or can be one or more swellable clay minerals. The encapsulant also can include or can be montmorillonite or bentonite. In certain embodiments, the container consists of the immobilizing agent or a blend of immobilizing agents.

Some embodiments of the system further include an activating agent or catalyst, which assists in the chemical breakdown of a pharmaceutical agent added to the system. The activating agent is selected from the group consisting of chelating ligands, metal complexes or compounds bound to organic ligands, transition metals and salts thereof, noble metals and salts thereof, metal chelators, water soluble phthalocyanines, aminocarboylates, aminoacids, tetra-amido macrocyclic ligands (TAML), derivatives of tetra-amido macrocyclic ligands, cyclam type ligands, and combinations thereof.

Another aspect of the invention is a method of disposing of a pharmaceutical dosage form. The method includes providing a container containing an oxidant and an immobilizing agent, placing the pharmaceutical dosage form into the container, and adding water to the container, whereby a pharmaceutical agent in the dosage form is chemically degraded.

DETAILED DESCRIPTION OF THE INVENTION

Figure 1:
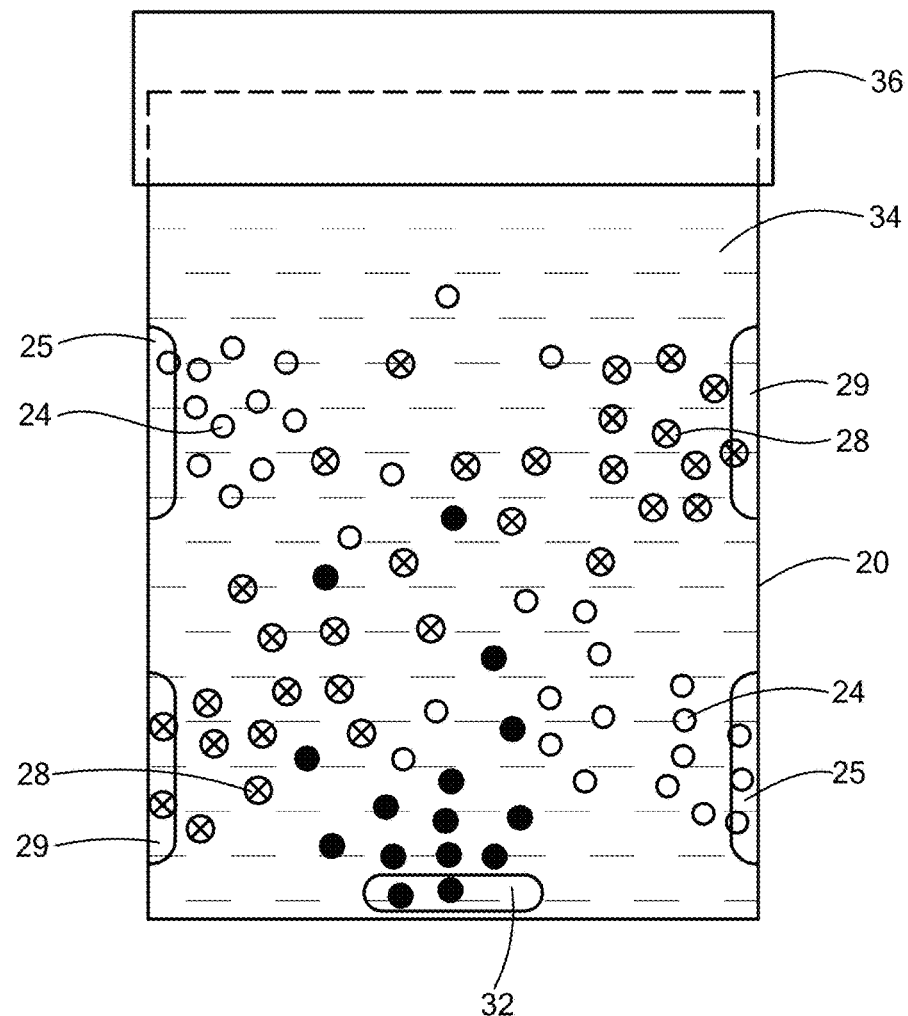
FIG. 1 is a schematic illustration of an embodiment of a kit according to the present invention.

A system and method are provided for disposing of a pharmaceutical dosage form by deactivating the active ingredient or ingredients of the pharmaceutical dosage form. The system can be provided in form of a kit or a device. The system and method result in 98 to 100% chemical degradation of the active ingredients in pharmaceuticals from the original dosage form, at least within 72 hours and generally within 24 hours or sooner. More particularly, the system and method employ an oxidant and an immobilizing agent, such as a gelling agent or an encapsulant, placed in a container. A pharmaceutical agent intended for disposal, which can be in any dosage form and in any amount, depending on the size of the container, is added to the container. Water is also added to the container. A rapid, smooth chemical deactivation of the active ingredient or ingredients in the pharmaceutical agent then occurs by a benign chemical oxidation process. Also, upon contact with the water, the gelling agent swells or expands in volume to form a gel or slurry, binding or trapping the other components in the container within the gel or slurry, where they remain after disposal.

The pharmaceutical agent can be any pharmaceutical agent, such as prescribed or over-the-counter drugs intended for human patients or for animals. The pharmaceutical agent can include, for example, any opioid drugs or medications containing opioid drugs. Opioid drugs that can be deactivated include codeine, fentanyl, morphine, oxycodone hydrocodone and their salts. The drugs and medications can be in any dosage form, such as, for example, pills, capsules, liquids, syrups, or transdermal patches.

The pharmaceutical agent is deactivated by an oxidation reaction that results in the complete or partial chemical breakdown of the agent. Pharmaceutical agents generally react with specific receptors in a target organism. Thus, transformation of the parent molecules by an oxidation reaction into one or more different chemical entities reduces or destroys the intended pharmaceutical effects of the agent. The deactivation goal is the destruction of the agent's ability to cause the intended effects, rendering the agent inaccessible for ingestion, injection, extraction or snorting, or at least ineffective if so administered, and safe for disposal in household trash and landfills.

The system and method are useful with a number of pharmaceuticals. For example, a number of salts of morphine and related opiates are used by the pharmaceutical industry, with the most common in current clinical use being the highly water soluble hydrochloride, sulfate, tartrate, and citrate forms. The sulfate and hydrochloride salts of the drug are over 300 times more water-soluble than their parent molecule. Less commonly in use are methobromide, hydrobromide, hydroiodide, lactate, chloride, and bitartrate forms.

Examples of oral short-acting opioids include codeine (as in TYLENOL #3® tablets), hydrocodone (as in ZYDONE® tablets or VICODIN® tablets), hydromorphone (such as DILAUDID® tablets), morphine (such as MSIR® tablets or capsules), oxycodone (as in PERCOCET® tablets, TYLOX® capsules, or ROXICODONE® tablets or oral solution), and propoxyphene (as in DARVON® capsules or DARVOCET-N® tablets).

Some short-acting opioid medicines contain the opioid alone, while others contain a combination of an opioid and a non-opioid, often acetaminophen (such as TYLENOL® tablets, caplets or gel caps). For example, oxycodone may be given alone (such as ROXICODONE® tablets or oral solution) or in combination with acetaminophen (as in PERCOCET® tablets). Examples of oral long-acting opioids include morphine (such as ORAMORPH® tablets, MS CONTIN® tablets, or AVINZA® capsules), and oxycodone (such as OXYCONTIN® tablets). The presence of a non-opioid in the formulation does not adversely affect the oxidation reaction of the opioid.

Pharmaceutical dosage forms typically include many other ingredients, such as fillers, binders, excipients, buffers, and the like. For example, TYLENOL with Codeine No. 3 contains powdered cellulose, magnesium stearate, pregelatinized starch (corn), and modified starch (corn). In the capsule form, in a hard gelatin capsule (titanium dioxide, sodium lauryl sulfate, sodium propionate, edetate calcium disodium, benzyl alcohol, butylparaben, propylparaben, methylparaben, gelatin), it contains croscarmellose sodium, colloidal silicon dioxide, magnesium stearate, pregelatinized starch, sodium lauryl sulfate, stearic acid and printing ink (pharmaceutical glaze, synthetic black iron oxide, lecithin, SDA-3A alcohol, deionized water, ethylene glycol monoethyl ether, and simethicone). The presence of these other ingredients does not adversely affect the oxidation reaction of the pharmaceutical. This is advantageous over prior art methods that utilize passive adsorption onto activated carbon, as these other ingredients can saturate the carbon.

In methods, systems, devices, and kits of the invention, one or more pharmaceutical dosage forms are added to a container containing an oxidant, a catalyst, and a gelling agent. The oxidant is preferably selected to achieve a final pH of the reacted product between 6 and 9 and to achieve a rapid chemical degradation of the opioid by an oxidation reaction, such as at least within 72 hours, and generally within 48 hours, or within 24 hours. Optionally, one or more pH neutralizers can be included, such as magnesium hydroxide (a nontoxic alkalinizing agent). In many cases, substantially all (e.g., at least 80%, at least 90%, at least 95%, at least 98%, at least 99%, or essentially 100%) of the degradation of the pharmaceutical agent(s) within the dosage form(s) can occur within 2 to 4 hours.

Suitable oxidants (also referred to herein as "oxidizing agents" or "deactivating agents") include (1) non-chlorine, stabilized peroxide compounds such as persulfate, permonosulfate, permanganate, and other stabilized peroxo compounds, and salts thereof; (2) stable chlorine-based oxidizing agents such as calcium or magnesium hypochlorite and other stable solid chloro compounds, and salts thereof such as calcium or magnesium salts; and (3). benign metal oxides such as manganese oxide, preferably in the form of nanometer sized (i.e., having an average diameter in the range of about 1 to about 999 nm) or micrometer sized (i.e., having an average diameter in the range of about 1 to about 999 micron) particles. The amount of oxidant provided per container can be determined according to the intended use of the container. For example, the oxidant can be provided in an amount ranging from about 0.25 grams to about 5 grams per container In a preferred embodiment, the oxidant is present in particulate or powder form in one or more packages (described further below) affixed to the floor or walls(s) of the container.

In certain embodiments, an activating agent or catalyst is included in the container to increase the effectiveness of the oxidant and/or to extend the oxidation reaction time. While the oxidant alone may be effective, a catalyst may accelerate the reaction and provide different decomposition patterns that are favorable.

The activating agent can include, for example, metal complexes bound to organic ligands, such as organic ligands containing N, O, N and O, carboxyl groups, or S, one or more salts of one or more transition metals, one or more salts of one or more noble metals, EDTA (ethylenediaminetetraacetate) or other metal chelators, water soluble phthalocyanine, tetra-amido macrocyclic ligands (TAML), derivatives of tetra-amido macrocyclic ligands, and cyclam type ligands. Ferric or ferrous complexes are particularly suitable due to their low cost. The activating agent can also be bound to a polymer by ionic or covalent interactions. A synthetic Fe-TAML macrocyclic complex that is suitable is commercially available from Green Ox Catalysts.

The activating agent or catalyst can be present in the container in a separate package, such as a water soluble pouch or capsule. Alternatively, the activating agent can be mixed with the gelling agent or loaded onto a carrier material. Preferably, the activating agent is provided in a separate compartment from the oxidizing agent, so as to ensure the stability of the oxidizing agent in storage. In a further embodiment, the activating agent/catalyst can be supported by benign powders such as carbon, silica, magnesium oxide, magnesium hydroxide, or other high surface area materials for increasing the surface area available to support catalysis and can be mixed with water soluble polymer pellets. Other suitable inert supports include lignin, cellulose powder, high surface area carbon fabrics, silica, inert nanopowders of a non-toxic nature, and the like. The activating agent or catalyst also can be supported on polymers such as polyacrylates (e.g., carbomer), polyethylene oxide, polyethylene imine, or other polymers that coordinatively or ionically bind the activating agent or catalyst. The use of such supports can serve the additional purpose of adjusting the pH near to or in the neutral to alkaline range, were certain activating agents (e.g., Fe-TAML) provide optimum performance.

Citric acid or citrate salts or suitable polyprotic acids can also be added to the container. The addition of citric acid or citrate enhances the solubility of the opioid molecules. For example, the aqueous solubility of morphine increased in a linear fashion with increases in the molar strength of citric acid that was added to acidify the medium, suggesting the formation of a soluble opioid-citrate complex (Roy et al., 1989). Thus, citric acid or citrate can serve a dual purpose, as a ligand for the activating agent, such as iron, as well as to help solubilize the opioid components faster at room temperature. Even NSAIDs containing amine bases may form soluble salts with suitable polyprotic acids.

To further add an environmental advantage, an inert immobilizing agent to encapsulate the small mass of reaction products is included in embodiments of this invention. The immobilizing agent can include one or more materials, such as be clay minerals or gelling materials, that swell and expand in volume upon contact with water and provide a barrier against leaching. Upon swelling, the inert agent binds, traps, or encapsulates the other products in the container and prevents their leaching from the container. The immobilizing agent can suitably contain clay minerals from the smectite family, such as montmorillonite (an ingredient of cat litter). In particular, a bentonite clay can be used, such as sodium bentonite, which is environmentally safe and acts as an encapsulant and a barrier to leaching. In one embodiment, a clay such as bentonite is provided as granules (preferably packaged within a packet or envelope), and the clay releases slowly over, e.g., 48-72 hours, so as to cover and/or absorb the reaction product. In another embodiment, a clay such as bentonite is provided as a lining layer for the container. Other modifications of geosynthetic liner clay materials can also be used. Carbon and polyacrylate also can be used as gelling agents, preferably in the form of granules. Other gelling or immobilizing agents, both natural and synthetic, can be used. The gelling agent also can be packaged within the container. For example, water soluble packages, such as pouches, sachets, capsules, or bags, can be made of polymers that swell, such as polyvinyl alcohol, water-soluble cellulose papers, or starch-based polymers. Examples of water soluble packaging materials for use with any of the chemical components placed into the container include methyl cellulose and polyvinyl alcohol. Gelling polymers such as poly acrylates, gelatin, alginates, polyethylene oxide, natural gums, and chitosan, could also be mixed with a clay mineral and the reagents and used as dispersible granules. Materials for gelling or immobilization also can be provided packaged in water soluble polymer bags; pouches; capsules; or as large tablets.

The gelling agent can be present in particulate or powder form in a package affixed to the floor or wall(s) of the container. The gelling agent can be present in other forms within the container. For example, it can be present within or formed as a barrier layer lining the interior wall(s) of the container. In one embodiment, a clay material such as bentonite can be sandwiched between two fabric layers and used to line the container or added as a pliable clay liner or laminated to the walls of the container. The use of bentonite clay as the containers themselves or bentonite impregnated commercial liners laminated to disposal bags for larger disposals is another embodiment of this invention. Sodium bentonite is environmentally friendly and safe to use. The invention employs innovative configurations to achieve such barrier effects in kits.

Figure 2:
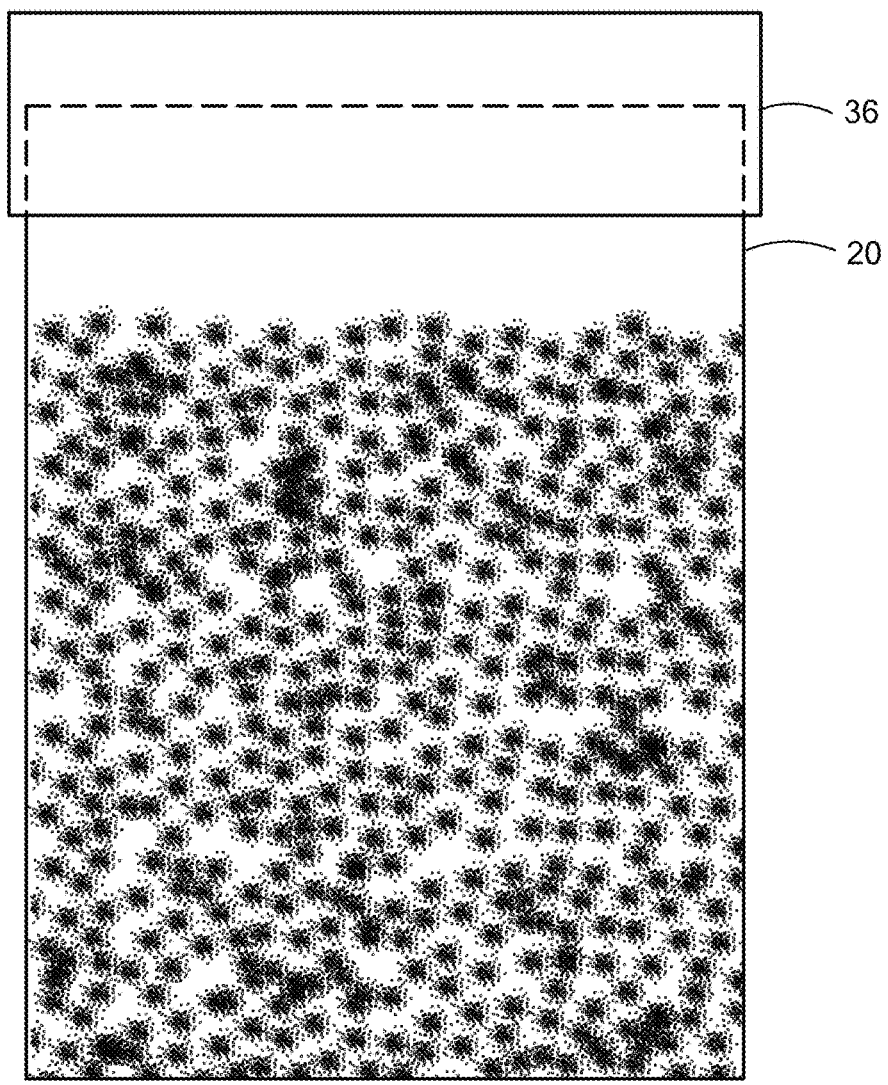
FIG. 2 is a schematic illustration of the kit of FIG. 1 after a period of time.
Figure 3:
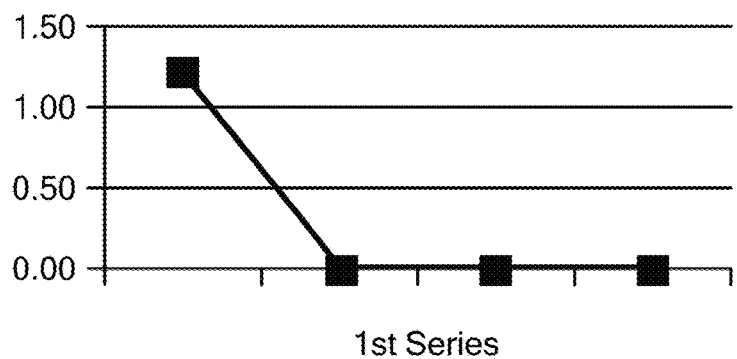
FIG. 3 is a graph illustrating a ratio of oxycodone to acetaminophen in a test sample, Sample No. 1, plotted over time.
Figure 4:
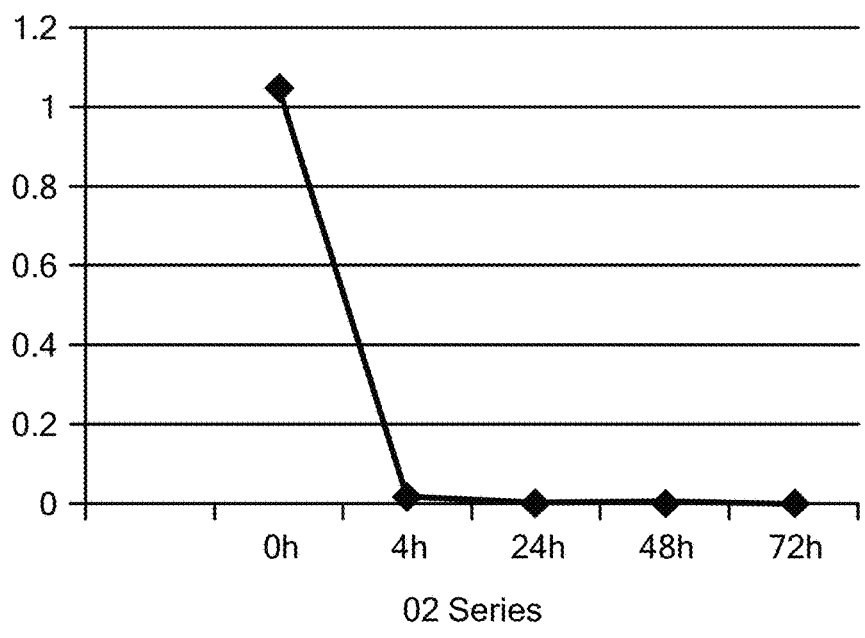
FIG. 4 is a graph illustrating a ratio of codeine to acetaminophen in a test sample, Sample No. 2, plotted over time.
Figure 5:
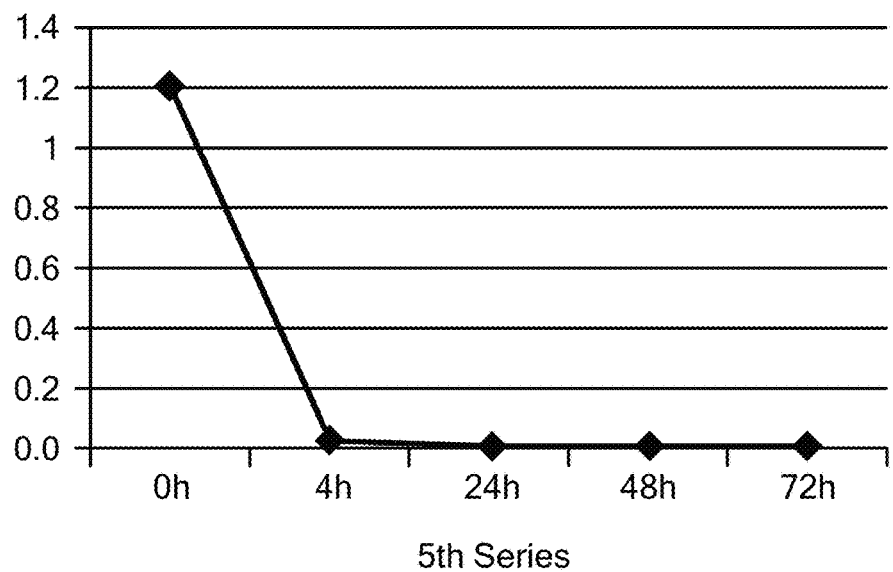
FIG. 5 is a graph illustrating a ratio of oxycodone to acetaminophen in a test sample, Sample No. 5, plotted over time.
Figure 6:
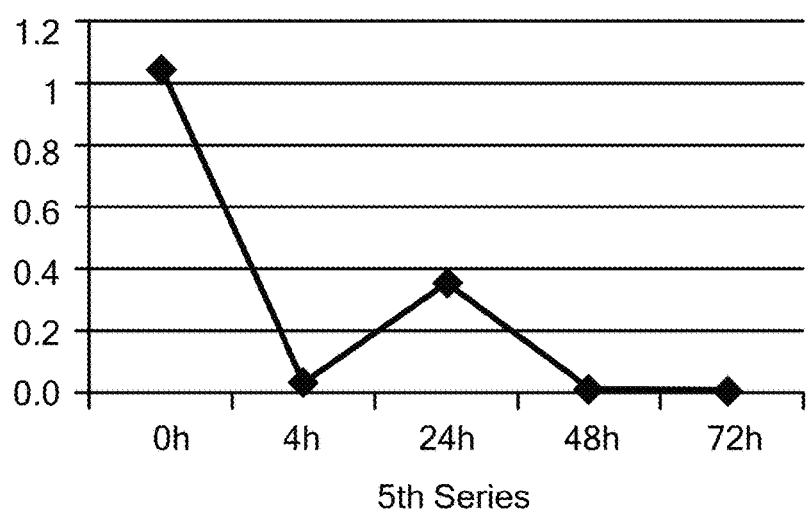
FIG. 6 is a graph illustrating a ratio of codeine to acetaminophen in a test sample, Sample No. 6, plotted over time.

One embodiment of the system in kit form is illustrated in FIGS. 1 and 2. The kit includes a waterproof container 20 in which an oxidant 24 and a gelling agent 28 are placed. A catalyst or activating agent may optionally be included as well. A user places a pharmaceutical 32, which can be in any dosage form, into the container, adds water 34, and closes the container, which prevents leakage while the reactions are occurring. The active ingredient or ingredients are rapidly deactivated by a benign chemical oxidation process. Upon contact with the water, the gelling agent swells and forms a gel or slurry, binding the other components in the container within the gel or slurry, illustrated schematically in FIG. 2. In some embodiments, small venting holes can be included, for example, in the lid. However, in this case, the container must remain upright for a period of time until the contents are sufficiently gelled or solidified, described further below. The closed container can be placed into the household trash, with the contents remaining in the container after disposal, precluding their leaching into a landfill or the water supply. The system can also be scaled up for use, for example, by a municipality or medical institution. For example, a disposable tank or vat can be provided to contain the oxidant and gelling agent and optional catalyst or activating agent. In such embodiments, supplementary packets of oxidizing agent, catalyst, and/or gelling agent can be provided so that the user can add them to the container periodically or with each addition of selected amounts of pharmaceutical materials added to the container.

The kit container can take a variety of forms. In one embodiment, the container 20 is cylindrical with a closed bottom and an open top and can be closed with a lid 36 or other closure. The lid can be separate or integral with the container. The lid can include screw threads that cooperate with mating screw threads at the upper edge of the container, can include a child proof mechanism, can include a snap fit mechanism, such as with a detent, or can be a friction fit. In another embodiment, the container can be in the form of a bag that has an open top that can be folded closed and sealed. The seal can be an adhesive seal, such as an area of pressure sensitive adhesive covered with a release liner that can be removed by the user when the bag is to be sealed. The container can be made of any suitable nonreactive material, such as coated paper or a plastic material.

The kit can be sized to handle any desired amount of pharmaceutical dosage forms. In one application, the container volume is between 150 and 250 mL and can receive between 3 and 9 oz. of water. The amounts of oxidant and gelling agent and activating agent, if present, depend on the size of the container and the amount to pharmaceutical product to be deactivated. In one embodiment, utilizing a kit form sized to deactivate 50 to 200 pills, each about 325 to 350 mg, the oxidant is present in an amount ranging from 0.25 g to 5 g, and the gelling agent in powder form is present in an amount ranging from 0.2 g to 2 g. The activating agent is present in an amount ranging from 0.01 mg to 2 g. In this way, an entire bottle of pills can be disposed of using a single kit.

Figure 8:
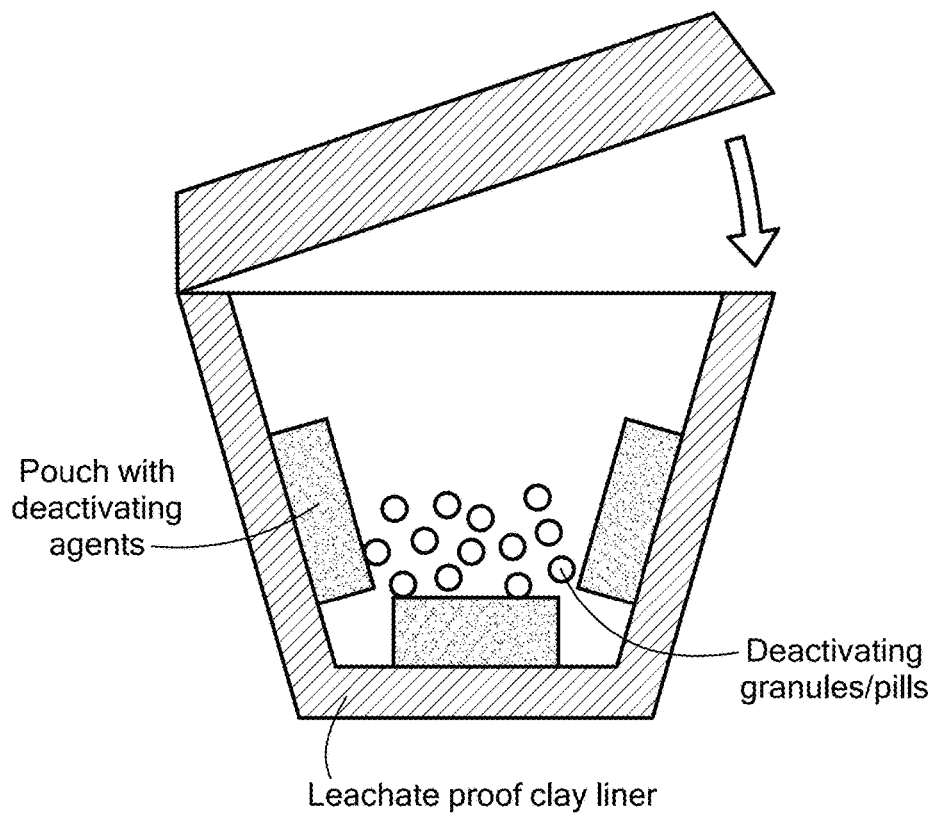
FIG. 8 is a schematic illustration of a mobile disposal system according to the present invention.

A device is an embodiment of the system that is larger than a kit, and includes a larger container, such as a tank or vat for use by a municipality or an institution. Such a device can contain correspondingly larger amounts of medications, and correspondingly larger amounts of deactivating agent, activating agent or catalyst, and immobilizing agent. One embodiment of such a device is depicted in FIG. 8, which shows a kitchen garbage container-sized device, which can optionally be mounted on wheels. The container has a leach-proof liner, which is disposed directly with all its contents when used. One or more deactivating agents can be added either as the pouches shown attached to the wall and bottom of the container or as granules or pills added from bulk supply to the container, such as each time medication for disposal is added to the container.

The oxidant or oxidant blend, the catalyst, and the gelling/immobilizing agent are placed in the container in a manner that keeps them separated until the kit is to be used. In one embodiment, for example, the oxidant is placed in one or more small water soluble packages and the gelling agent similarly is placed in one or more small water soluble packages. The packages can be formed of any suitable water soluble material, such as a water soluble polymer, for example, methyl cellulose or polyvinyl alcohol. The contents of packages can have any suitable form, such as powder or compressed tablets in a pouch, sachet, capsule, or bag. The packages can be fixed to the wall(s) and/or floor of the container in any suitable manner, such as with an adhesive. Preferably the container is a "stand-up pouch" or gusseted bag containing barrier polymer lamination and/or metal foil. While the packages also can be provided unattached within the container, suitable attachment to the wall or bottom of the container is preferred, so that they do not get separated from the container or removed by the user. When water is added to the container, the oxidant and gelling agent are released and disperse into the water within the container, illustrated schematically in FIG. 1. The pharmaceutical formulation also disperses into the water, where it mixes with the oxidant and the oxidation reaction occurs. See FIG. 1. The gelling agent, upon contact with the water, forms a gel or slurry and mixes with the other components, thereby binding the other components as a solid bulk within the container, illustrated schematically in FIG. 2. The container can then be placed in the trash, or allowed to stand under ambient conditions for a selected period of time and later placed in the trash.

In another embodiment, the container can be provided in two parts, a smaller container and a larger container. The smaller container can be nested within the larger container. The bottom of the smaller container contains apertures therein, such as with a mesh, through which water can flow, and holds any insoluble non-opioid analgesics. Opioids are generally soluble as they are present in a salt form in medications. In further embodiments, the container can include a window, or the container can be transparent, so that a user can see the level of water added. Alternatively, a mark can be placed inside the container to identify the level to which the water should be filled.

An effervescence mechanism optionally can be provided for better dispersion of the pharmaceutical dosage form, the opioid or other pharmaceutical agent, the catalyst (if present) and the gelling agent. In this case, the container should include a vent mechanism, such as one or more small holes in the cover. However, an effervescence mechanism is generally not preferred with a closed container.

Several tests were performed on pharmaceuticals containing oxycodone and acetaminophen and containing codeine and acetaminophen. Because acetaminophen is generally present in common opioid drugs, the tests also followed the amount of acetaminophen in the presence of the reagents.

Containers were prepared containing 2.5 grams of the oxidant, 0.5 grams of the immobilizing agent, and 1-2 mg of a macrocyclic Fe-TAML complex as the activating agent. The pharmaceutical dosage form was placed in the container, and 20 mL of water at room temperature was added to the container. The contents were sampled at 4 hours, 24 hours, 48 hours, and, for some tests, 72 hours. Results are presented in Tables 1 and 2 below and in FIGS. 3-7. In the tables, the following abbreviations are used: O, oxycodone; C, codeine; and A, acetaminophen.

TABLE 1

| Sample ID | Time point, hours | Description | Acetaminophen (152.1) | Oxycodone (316.3) | Codeine (300.3) | Rate loss of drug concentration |
|---|---|---|---|---|---|---|
| 1 | 0 | 10 tablets O 10 mg AN 325 mg | 180,592,560 | 218,879,580 | | 1.2120 |
| | 4 | | 102,275,072 | 1,015,818 | | 0.0099 |
| | 24 | | 190,000,112 | 44782 | | 0.0002 |
| | 48 | | 53,102,768 | 0 | | 0.0000 |
| 2 | 0 | 10 tablets C 30 mg AN 350 mg | 183,216,720 | | 191,759,944 | 1.0466 |
| | 4 | | 105,490,640 | | 2,371,398 | 0.0225 |
| | 24 | | 137,165,104 | | 24,841 | 0.0002 |
| | 48 | | 162,100,512 | | 1,339,499 | 0.0083 |
| | 72 | | 81,338,200 | | 14,977 | 0.0002 |
| 3 | 0 | 6.5 tablets AN 500 mg | 246,869,168 | | | |
| | 4 | | 140,162,016 | | | |
| | 24 | | 171,163,152 | | | |
| | 48 | | 64,644,916 | | | |
| 5 | 0 | 10 tablets O 10 mg AN 325 mg | 180,592,560 | 218,879,580 | | 1.2120 |
| | 4 | | 130,867,128 | 2,366,433 | | 0.0181 |
| | 24 | | 156,362,256 | 40,000 | | 0.0003 |
| | 48 | | 36,177,868 | 83185 | | 0.0023 |
| | 72 | | 82,877,240 | 17686 | | 0.0002 |
| 6 | 0 | 10 tablets C 30 mg AN 350 mg | 183,216,720 | | 191,759,944 | 1.0466 |
| | 4 | | 80,334,520 | | 2,091,722 | 0.0260 |
| | 24 | | 155,816,992 | | 54,495,324 | 0.3497 |
| | 48 | | 13,183,815 | | 12,582 | 0.0010 |
| | 72 | | 68,366,056 | | 287,906 | 0.0000 |
| 7 | 0 | 6.5 tablets AN 500 mg | 246,869,168 | | | |
| | 4 | | 139,846,336 | | | |
| | 24 | | 80,593,232 | | | |
| | 48 | | 17,009,258 | | | |

TABLE 2

| Sample ID | Time point, hours | Description | Comments |
|---|---|---|---|
| 1 | 0 | 10 tablets | |
| | 4 | O 10 mg | 100% conversion |
| | 24 | AN 325 mg | 98% conversion |
| | 48 | | 100% conversion |
| 2 | 0 | 10 tablets | |
| | 4 | C 30 mg | 98% conversion |
| | 24 | AN 350 mg | 99% conversion |
| | 48 | | 99% conversion |
| | 72 | | 99% conversion |
| 3 | 0 | 6.5 tablets | |
| | 4 | AN 500 mg | |
| | 24 | | |
| | 48 | | |
| 5 | 0 | 10 tablets | |
| | 4 | O 10 mg | 98% conversion |
| | 24 | AN 325 mg | 100% conversion |
| | 48 | | 99% conversion |
| | 72 | | 99% conversion |
| 6 | 0 | 10 tablets | |
| | 4 | C 30 mg | 97% conversion |
| | 24 | AN 350 mg | Not homogenous: 60% conversion |
| | 48 | | 96% conversion |
| | 72 | | 100% conversion |

Figure 7:
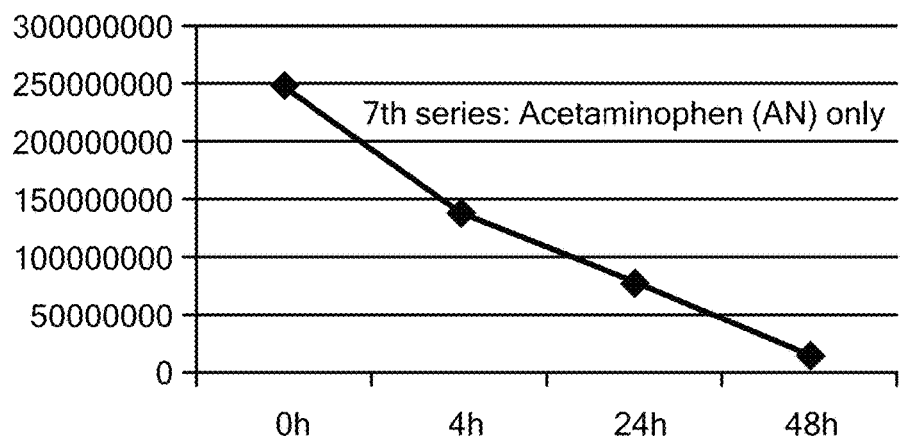
FIG. 7 is a graph illustrating the amount of acetaminophen in a test sample, Sample No. 7, plotted over time.

FIGS. 3 through 6 illustrate the ratio of either oxycodone to acetaminophen or codeine to acetaminophen in the appropriate test sample, Samples 1, 2, 5, and 6, plotted over time. FIG. 7 illustrates the amount of acetaminophen alone, Sample No. 7, plotted over time.

As can be seen, particularly from Table 2, the system and method resulted in 98 to 100% of the narcotic components in common oral prescription drugs deactivated within two to four hours.

Table 3 shows the results of a comparison of two catalysts: iron sulfate and iron-TAML. Iron-TAML was provided as a mixture with magnesium hydroxide powder, since the required amount of Fe-TAML was small; the amount of mixture added provided 1-2 mg of Fe-TAML Fe-TAML works well above pH 6 (i.e., in the range of neutral pH). The results showed better efficacy for the TAML catalyst in medications containing acetaminophen.

TABLE 3

| S. No | Sample Code | | AN, mg/mL | Oxycodone, mg/10 mL | Codenine, mg/mL | Expected Mass | M Area (ES+) | | | Rate (%) against AN | Reaction/ Conversion rate (%) |
|---|---|---|---|---|---|---|---|---|---|---|---|
| | | | | | | | AN (152.1) | O (316.3) | C (300.3) | | |
| 1 | Pure AN | Unreacted | 300 | — | — | 151.1 | 60,515,976 | | | | |
| 2 | AN/O | | 325 | 30 | — | 151.1, 315.2 | 60,634,360 | 25,360,456 | | 41.83 | |
| 3 | AN/C | | 300 | — | 30 | 151.1, 299.1 | 51,236,504 | | 26,574,264 | 51.87 | |
| 1C1 | Pure AN | C-1 | 300 | — | — | 151.1 | 44,229,400 | | | | |
| 2C1 | AN/O | Catalyst-I | 325 | 30 | — | 151.1, 315.2 | 19,530,086 | 1,530,325 | | 7.84 | 81% |
| 3C1 | AN/C | Reacted | 300 | — | 30 | 151.1, 299.1 | 30,340,974 | | 8,106,289 | 26.72 | 48% |
| 1C2 | Pure AN | C-2 | 300 | — | — | 151.1 | 38,199,344 | | | | |
| 2C2 | AN/O | Catalyst-II | 325 | 30 | — | 151.1, 315.2 | 37,849,824 | 165,987 | | 0.44 | 99% |
| 3C2 | AN/C | Fe-TAML Reacted | 300 | — | 30 | 151.1, 299.1 | 41,618,524 | | 296,486 | 0.71 | 99% |

The results can be summarized as follows:

Oxycodone in medication was reacted with catalyst I at an 81% conversion rate. With Catalyst-II, it was completely reacted (99% conversion).

Codeine in medications was reacted with Catalyst 1 at 48% conversion rate. With Catalyst-II, codeine was completely reacted (99% conversion).

Another experiment was performed, using 10 tablets of opioid-containing medications per container. In order to match the weight of acetaminophen (AN) in the 10 tablets, 6.5 tablets of 500 mg pure acetaminophen tablets were used for comparison. The results were as follows:

|  | Cat-1 | Cat-2 |
|---|---|---|
| AN/O | 69% reacted | 99% reacted |
| AN/C | 46% reacted | 97% reacted |

The best evidence for the chemical disintegration of opioid ingredients was obtained from the analysis of LC-MS, using comparison of the area under the curve before and after treatments with catalyst 1 and catalyst 2. However, it is expected that with enough time the use of only catalyst 1 could reach 100% deactivation.

The system and method provide a number of advantages. In kit form, the system is economical and convenient to use by consumers. The kit can be distributed by medical practitioners, pharmacies, hospitals and hospices to accompany the medications or when patients are discharged. The narcotic components cannot be recovered after the oxidation reaction takes place. The narcotic components do not leach into landfills from the container and do not end up in the water supply.

It will be appreciated that the various features described herein can be combined with each other in various ways. The invention is not to be limited by what has been particularly shown and described, except as indicated by the appended claims.

What is claimed is:

1. A system for disposing of a pharmaceutical dosage form, the system comprising:
   a container;
   an oxidant selected from the group consisting of non-chlorine, stabilized peroxide compounds; stable chlorine-based oxidizing agents; and metal oxides, wherein the oxidant is contained in a first water soluble package;
   a transition metal complex of a tetra-amido macrocyclic ligand as activating agent; and
   an immobilizing agent;
   wherein (i) the activating agent and the immobilizing agent are contained in second and third water soluble packages, or (ii) the activating agent and the immobilizing agent are provided as a mixture in a second water soluble package, or (iii) the activating agent is provided in a second water soluble package and the container comprises the immobilizing agent.

2. The system of claim 1, wherein the stabilized peroxide compounds are selected from the group consisting of persulfate, permonosulfate, perborate, percarbonate, permanganate, stable organic peroxo compounds, and salts thereof.

3. The system of claim 1, wherein the oxidant comprises magnesium oxide or calcium oxide.

4. The system of claim 1, wherein the oxidant comprises one or more metal oxides in the form of particles ranging in size from nanometers to micrometers.

5. The system of claim 1, wherein the immobilizing agent comprises a gelling agent or an encapsulant.

6. The system of claim 5, wherein the encapsulant comprises one or more swellable clay minerals.

7. The system of claim 5, wherein the encapsulant comprises montmorillonite or bentonite.

8. The system of claim 7, wherein the bentonite comprises sodium bentonite.

9. The system of claim 1, wherein the immobilizing agent comprises activated carbon.

10. The system of claim 1, wherein the container includes a closure.

11. The system of claim 1, wherein the container comprises a waterproof material.

12. The system of claim 1, wherein the transition metal is Fe.

* * * * *